Aug. 27, 1935.   M. D. HELFRICH   2,012,760
BALL COCK
Original Filed July 8, 1932

Patented Aug. 27, 1935

2,012,760

UNITED STATES PATENT OFFICE 2,012,760

BALL COCK

Michael D. Helfrich, Evansville, Ind.

Original application July 8, 1932, Serial No. 621,488. Divided and this application January 23, 1933, Serial No. 653,156

1 Claim. (Cl. 251—41)

This invention relates to improvements in ball cocks for water closet flush tanks and relates, more particularly, to the fulcrum lever, links, float ball lever and connections having to do with the operation of the ball cock or valve.

The object of the present invention is to simplify the system of fulcrum lever, float ball lever, and links by which the valve is operated and to render it easier to disconnect and swing back these parts to afford access to the ball cock. Whereas constructions heretofore in common use have required two thumb screws and a link or links connecting the float ball lever with the fulcrum lever, on the other hand, my present improvements do away with one of these screws and the link-connection aforesaid and provide pivoted links directly connecting the float ball lever to the ball cock body. In my improved construction by simply removing the single thumb screw, the entire system of levers and links may be quickly swung back, while still connected to the ball cock body, thereby enabling access to be quickly had to the ball cock or valve and obviating the necessity of detaching the levers, which has heretofore resulted in their becoming damaged or the thumb screws becoming lost.

A practical embodiment of the invention is hereinafter described and is shown in the accompanying drawing, in which.

Figures 1, 2:
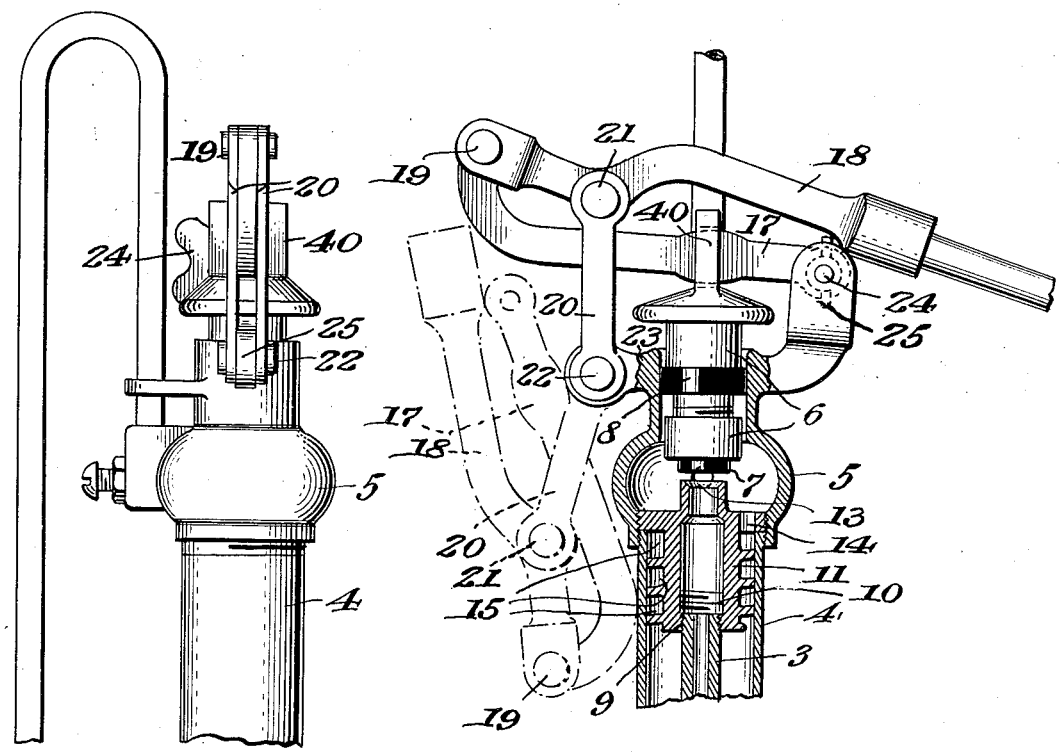
Figure 1 is a side elevation.
Fig. 2 is a similar view taken at right angles to Fig. 1, the ball cock body and upper part of the hush-tube being in section, full lines representing the fulcrum lever, links, and float ball lever in position for use, dot-and-dash lines showing how these parts may be swung backwardly, without detachment, by removing the single thumb screw.

The upper part of the ball cock installation being the only part having to do with the present invention, the lower part by which the ball cock is connected to and supported by the bottom of the flush tank, is not shown.

This application is a continuation in part of my application Serial No. 529,198, filed April 10, 1931, now Patent No. 1,999,904, granted April 30, 1935, and is also a division of my application Serial No. 621,488, filed July 8, 1932.

The water supply tube 3 is supported on the bottom of the flush tank and is surrounded by the hush-tube 4. Connected to the upper part of the hush-tube 4 by screw threads, is the ball cock body 5.

The ball cock or valve 6 is provided with a washer 7 and with a packing 8.

The upper end of the supply tube 3 is screw threaded at 9 for engagement with screw threads 10 of the cushioning worm or spiral 11 which snugly fits the interior of the hush-tube 4 and is provided with a valve seat 13 on which the washer 7 of the ball cock or valve 6 normally rests to prevent passage of water from the tube 3 into the body 5.

Holes 14 extending through the head 12, permit water to flow when the valve or ball cock 6 is raised, the water passing in to the space 15 and thence into the interior 16 of the hush-tube 4.

The operating means for the ball cock or valve 6 embodies a fulcrum lever 17, a float ball lever 18, which is pivoted thereto at 19 on a pivot, a pair of links 20 which are pivoted at 21 to the float ball lever 18 and are pivoted at 22 to an ear 23 on the ball cock body 5, and a single thumb screw 24 by which the fulcrum lever 17 is detachably pivoted to a pair of ears 25 on the body 5.

Heretofore, in addition to the thumb screw for pivoting the lever 17 to the body 5, there has been provided a pair of links integral with the said body, to which links the float ball lever 18 has been pivotally connected by a second thumb screw, necessitating the provision of two thumb screws, and the employment of a linkage between the fulcrum lever and the float ball lever. With the old construction, both of the thumb screws have had to be removed, completely detaching the levers, when access to the ball cock became necessary. The detachment of the levers often resulted in loss of the thumb screws and, in addition, the links or lugs integral with the body have been in the way of access to the ball cock.

My present improvements overcome these defects, as it will be seen that it is only necessary to remove the single thumb screw 24 to permit the entire operative system to be thrown back, as shown in dot-and-dash lines in Fig. 2, completely clearing the top of the appliance and permitting ready access to the ball cock or valve.

Preferably, the connections 19, 21, 22, are rivets so that the parts cannot become detached.

The lever 17 co-operates with the ball cock or valve 6 and, as shown, this co-operation is effected through the medium of a loop or open ear 40 on the ball cock or valve 6 through which loop passes the lever 17.

What I claim is:

In valve actuating mechanism, the combination with a valve body, of valve operating means disposed above the body having permanent pivotal or hinged connection with the body and an additional single releasable connection with the body enabling said valve operating means to be bodily swung back on said pivotal or hinged connection when said single releasable connection is released, said valve actuating means then being supported from the body by the hinged connection aforesaid.

MICHAEL D. HELFRICH.